United States Patent
Persson et al.

(10) Patent No.: US 11,866,017 B2
(45) Date of Patent: Jan. 9, 2024

(54) BRAKE ACTUATOR

(71) Applicant: Wabtec Faiveley Nordic AB, Landskrona (SE)

(72) Inventors: Tobias Persson, Kavlinge (SE); Gustav Rehnborg, Malmö (SE)

(73) Assignee: Wabtec Faiveley Nordic AB, Landskrona (SE)

( * ) Notice: Subject to any disclaimer, the term of this patent is extended or adjusted under 35 U.S.C. 154(b) by 770 days.

(21) Appl. No.: 16/975,573

(22) PCT Filed: Mar. 8, 2019

(86) PCT No.: PCT/EP2019/055893
§ 371 (c)(1),
(2) Date: Aug. 25, 2020

(87) PCT Pub. No.: WO2019/170882
PCT Pub. Date: Sep. 12, 2019

(65) Prior Publication Data
US 2020/0398807 A1 Dec. 24, 2020

(30) Foreign Application Priority Data
Mar. 9, 2018 (SE) .................................. 1850263-3

(51) Int. Cl.
*B60T 17/08* (2006.01)
*F16D 65/28* (2006.01)
(Continued)

(52) U.S. Cl.
CPC .......... *B60T 17/083* (2013.01); *B60T 17/086* (2013.01); *F16D 65/28* (2013.01); *F16D 2121/02* (2013.01); *F16D 2123/00* (2013.01)

(58) Field of Classification Search
CPC .... F16D 2123/00; F16D 65/28; B60T 17/086; B60T 17/083
See application file for complete search history.

(56) References Cited

U.S. PATENT DOCUMENTS 3,955,480 A * 5/1976 Wosegien ............. B60T 17/086
188/110
4,080,875 A * 3/1978 Repolovsky .......... B60T 17/083
92/29

(Continued)

FOREIGN PATENT DOCUMENTS

DE 3101608 A1 8/1982
EP 2154040 B1 2/2010
(Continued)

OTHER PUBLICATIONS

International Search Report for PCT/EP2019/055893 dated Jun. 14, 2019 (2 pages).

(Continued)

*Primary Examiner* — Abiy Teka
(74) *Attorney, Agent, or Firm* — The Small Patent Law Group LLC; Christopher R. Carroll

(57) ABSTRACT

A brake actuator for a railway vehicle brake system has a thrust sleeve configured to provide braking force to the brake system, and a slide axially moveable in the thrust sleeve between a release position and a locking position. The actuator further has a piston biased by spring means and linked to an anchoring member. A plurality of balls are disposed in respective openings of the sleeve between the slide and the anchoring member. In the locking position, the balls are configured to move under the action of a profiled surface of the slide to axially couple the anchoring member with the sleeve. In the release position, the balls are configured to axially uncouple the anchoring member from the sleeve. The profiled slide surface has a locking groove configured to engagingly receive the balls when the slide is in the locking position.

15 Claims, 4 Drawing Sheets

(51) Int. Cl.
     *F16D 121/02*      (2012.01)
     *F16D 123/00*      (2012.01)

(56)            References Cited

U.S. PATENT DOCUMENTS 4,703,141  A       10/1987   Grunst
     4,951,552  A       8/1990    Fox
     2019/0084546 A1 *  3/2019    Lu .................. B60T 17/083

FOREIGN PATENT DOCUMENTS

EP       3498550 A1 *   6/2019   .............. B60T 13/38
     GB       1192337 A      5/1970
     GB       2045868 A      11/1980
     GB       2109863 B      10/1983
     SU       1316881 A1     6/1987
     WO       2008085128 A1  7/2008

OTHER PUBLICATIONS

Office Action dated Sep. 19, 2022 for corresponding Chinese Patent Application No. 201980014807.1 (6 pages).
English Translation of Office Action dated Sep. 19, 2022 for corresponding Chinese Patent Application No. 201980014807.1 (7 pages).
First Examination Report dated Sep. 17, 2021 for corresponding Indian Patent Application No. 202017036821 (5 pages).

* cited by examiner

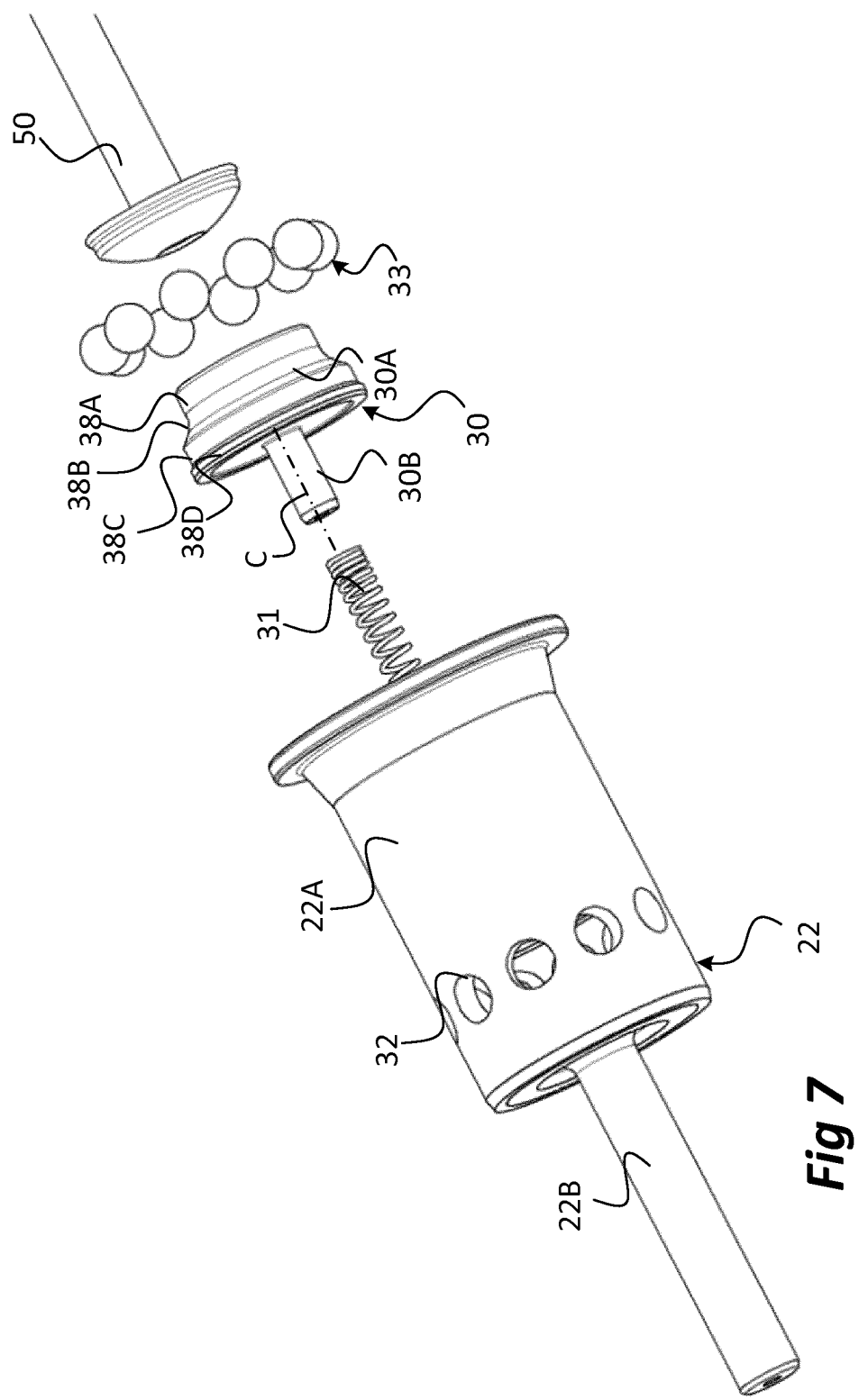

BRAKE ACTUATOR

This application is a National Stage Application of PCT/EP2019/055893, filed 8 Mar. 2019, which claims benefit of Serial No. 1850263-3, filed 9 Mar. 2018 in Sweden and which applications are incorporated herein by reference. To the extent appropriate, a claim of priority is made to each of the above disclosed applications.

TECHNICAL FIELD

The present invention relates to braking of railway vehicles, and it concerns in particular a parking brake or emergency brake system including a brake actuator acting on a brake cylinder included in a railway vehicle brake.

BACKGROUND

Railway vehicles are generally equipped with brake systems having a piston which is movable under pneumatic action and which causes a braking action of a brake block against a wheel of the railway vehicle.

In general, such brake systems incorporate a parking or emergency brake actuator which is activated on purpose or in case of involuntary pressure drop of the pressurized fluid. In such brake actuators, a braking effect is applied in response to a pressure drop or in the absence of pressurized fluid, by providing braking force by means of a spring. Once the brake actuator is actuated, it remains in an actuated state until released or until pressure is restored in the actuator.

A railway vehicle parking brake system reflecting the background art described above is known from WO2008/085128A1. Another known railway vehicle brake system which includes a parking or emergency brake actuator, is disclosed in EP215404061. Although these known systems represent well-functioning designs, there is still room for improvements.

In this technical field of braking systems, economy of space and thus efficient utilization of installation dimensions are growing in importance. This requires efficient utilization of space available and thus compact designs of braking systems and components included therein. Furthermore, economy of manufacture, assembly and installation are factors which are increasingly becoming of relevance.

SUMMARY

On this background, it is an object of the present invention to provide a brake actuator which is improved over prior art and which in particular facilitates efficient utilization of available installation dimensions.

It is a further object of the present invention to provide a brake actuator which facilitates economy of manufacture, assembly and installation.

These objects, and further objects which will appear from the following description, have now been achieved by the technique set forth in the appended independent claims; preferred embodiments being defined in the related dependent claims.

In a first aspect, there is provided a brake actuator for a brake cylinder of a railway vehicle brake system. The brake actuator comprises a thrust sleeve configured to provide braking force to the brake system, and a slide mounted axially moveable in the thrust sleeve between a release position and a locking position. Furthermore, the brake actuator comprises a piston which is biased or driven by resilient means and linked to an anchoring member. A plurality of balls are disposed in respective openings of the thrust sleeve between the slide and the anchoring member. In the locking position, the balls are configured to move under the action of a profiled surface of the slide to adopt a projecting position in relation to the sleeve to axially couple the anchoring member with the thrust sleeve. In the release position, the balls are configured to adopt a retracted position in relation to the thrust sleeve to axially uncouple the anchoring member from the thrust sleeve. The profiled surface of the slide comprises a locking groove configured to engagingly receive the balls when the slide is in the locking position. The locking groove is circumferentially oriented and extends continuously along a circumference of the slide.

This configuration brings about the advantage that the slide can be rotation symmetric. Thereby the complexity of manufacture and assembly is reduced substantially while providing for a robust design of the slide. Thus, the overall economy of production is improved while accommodating stipulated requirements relating to reliability, fatigue and longevity of the brake actuator.

The rotation symmetric feature practically enables the whole circumferential surface of the slide to perform the same function. Hence, the slide may be used regardless the number of balls and/or may be simply rotated in case of wear instead of being replaced. This improves flexibility and longevity of the slide and the actuator and also facilitates reduced maintenance.

In one embodiment, the profiled slide surface comprises a release groove configured to engagingly receive the balls when the slide is in the release position. The release groove is circumferentially oriented and extends continuously along a circumference of the slide.

The release groove and/or the locking groove may each comprise cylindrical portions extending parallel to a center axis of the slide.

In one embodiment, the anchoring member comprises an annular portion with an open end portion configured to receive the thrust sleeve, and a bottom end portion provided with a centrally arranged orifice having a diameter substantially smaller than the diameter of the open end portion.

The thrust sleeve may comprise a cylindrical portion and a hollow shaft portion having an outer diameter substantially smaller than the outer diameter of the cylindrical portion. Thereby, the hollow shaft portion may still be accommodated by the anchoring member even if the anchoring member is provided with a closed end.

In one embodiment, the hollow shaft portion is configured to protrude through the centrally arranged orifice. Thus, the hollow shaft portion may protrude through a pressure chamber to act on the brake cylinder.

The hollow shaft portion may envelope and house a resilient member acting on the slide. Thereby, the slide is biased to adopt its locking position.

In a further embodiment, the slide comprises a head portion received in the annular portion and a tail portion which has a substantially smaller diameter and which is received in the hollow shaft portion. Thereby the slide is configured to be radially supported by the hollow shaft portion of the thrust sleeve.

The anchoring member may be received in the piston to form a flush lateral surface and/or a transverse surface therewith. Thereby, the thrust sleeve may abut, be supported by and slide against both the piston and the anchoring member.

In a yet further embodiment, the anchoring member comprises an inner circumferentially extending recess configured to receive and engage the plurality of balls in the locking position. Thereby the balls may adopt a projecting position in relation to the thrust sleeve, whereby the anchoring member is axially coupled to the thrust sleeve via the balls.

The slide may comprise a transition groove extending from the release groove to the locking groove and may have a curved portion. The transition groove may be circumferentially oriented and extending continuously along a circumference of the slide. The slide thereby provides for a smooth gradual transition of the balls from the lock position to the release position and vice versa.

In a still further embodiment, the brake actuator comprises a release device configured to drive the slide from its locking position to its release position. The brake cylinder may thereby be manually relieved from the force exerted by the hollow shaft portion of the thrust sleeve.

In a second aspect, there is provided a brake actuator for a brake cylinder of a railway vehicle brake system. The brake actuator comprises a thrust sleeve configured to provide braking force to the brake system, and a slide mounted axially moveable in the thrust sleeve between a release position and a locking position. Furthermore, the brake actuator comprises a piston which is biased or driven by resilient means and linked to an anchoring member. A plurality of balls are disposed in respective openings of the thrust sleeve between the slide and the anchoring member. In the locking position, the balls are configured to move under the action of a profiled surface of the slide to adopt a projecting position in relation to the thrust sleeve to axially couple the anchoring member with the thrust sleeve. In the release position, the balls are configured to adopt a retracted position in relation to the thrust sleeve to axially uncouple the anchoring member from the thrust sleeve. The anchoring member comprises an annular portion with an open end portion receiving the thrust sleeve, and a bottom end portion provided with a centrally arranged orifice.

The configuration of the anchoring member provided with the bottom end portion enables reduction in diameter of a hollow shaft portion of the thrust sleeve, while it may be radially supported by the anchoring member. Furthermore, the configuration of the anchoring member additionally facilitates an increased pneumatic surface comprising the piston and the bottom end portion of the anchoring member. The pneumatic surface is exposed to the pressure of the pressure chamber provided with pressurized fluid pneumatically acting on the surface. Thus, the pneumatic surface is increased and the installation dimension is improved.

In one embodiment of the second aspect, the thrust sleeve comprises a cylindrical portion and a hollow shaft portion having a diameter substantially smaller than the diameter of the cylindrical portion. The hollow shaft portion is received in the centrally arranged orifice.

In a third aspect, there is provided a rail vehicle brake system comprising a brake actuator according either of the first and second aspects, respectively. In accordance with advantages set forth above, a rail vehicle brake system having such a brake actuator achieves improvements in production economy and robustness as well as improvements in required installation dimension of the brake system.

BRIEF DESCRIPTION OF THE DRAWINGS

Embodiments of the invention and related advantages will be illustrated in more detail below by a number of non-limiting examples and with reference to the accompanying schematic drawings, in which:

FIG. 7 is an exploded isometric view of certain components included in the brake actuator of FIGS. 1-6.

DETAILED DESCRIPTION OF EMBODIMENTS

Figure 1:
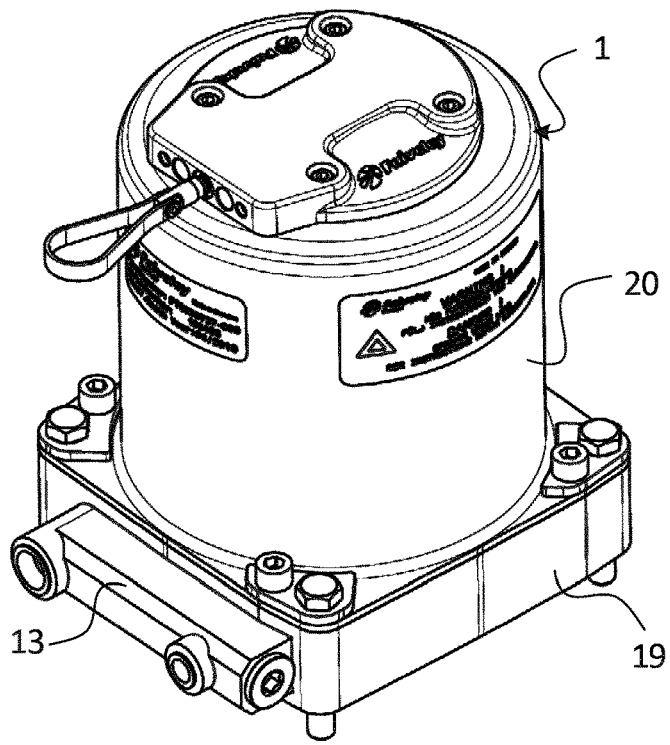
FIG. 1 is an isometric perspective view of a brake actuator according to an embodiment.
Figure 2:
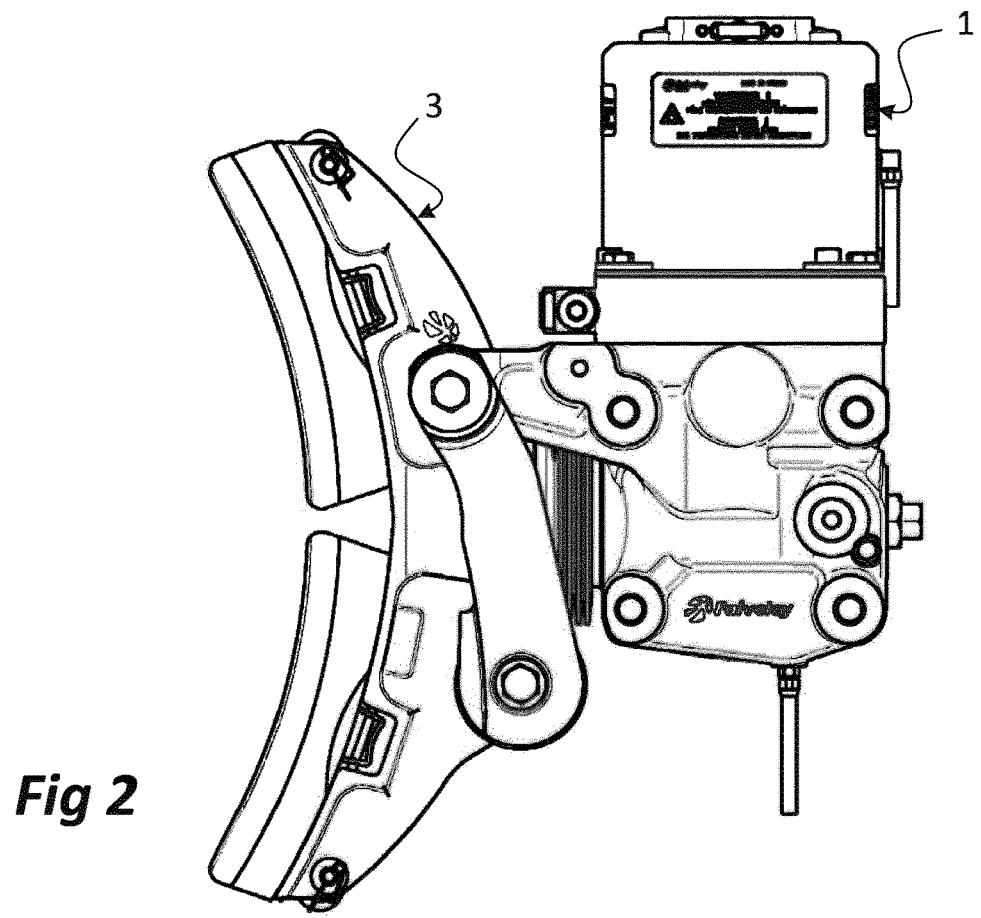
FIG. 2 is a side view of an exemplary parking brake implementation of the brake actuator of FIG. 1.

Referring to FIGS. 1 and 2, there is depicted a possible implementation of a brake actuator 1 in capacity of an actuator for a parking brake 3, which is adapted to act on a brake cylinder 2. Such a parking brake actuator may form part of a railway vehicle braking system.

The brake actuator 1 and features thereof will now be generally described with reference to FIG. 3. The actuator 1 comprises a housing or body 20 having a base member 19 and a cylindrical portion 25. The base member 19 has an opening 21 vis-à-vis the brake cylinder 2. The opening 21 is a circular opening slidingly receiving a thrust member in the shape of a sleeve 22 fitting in the opening 21 in a sealed manner by virtue of sealing means 23, such as an O ring.

Figure 4:
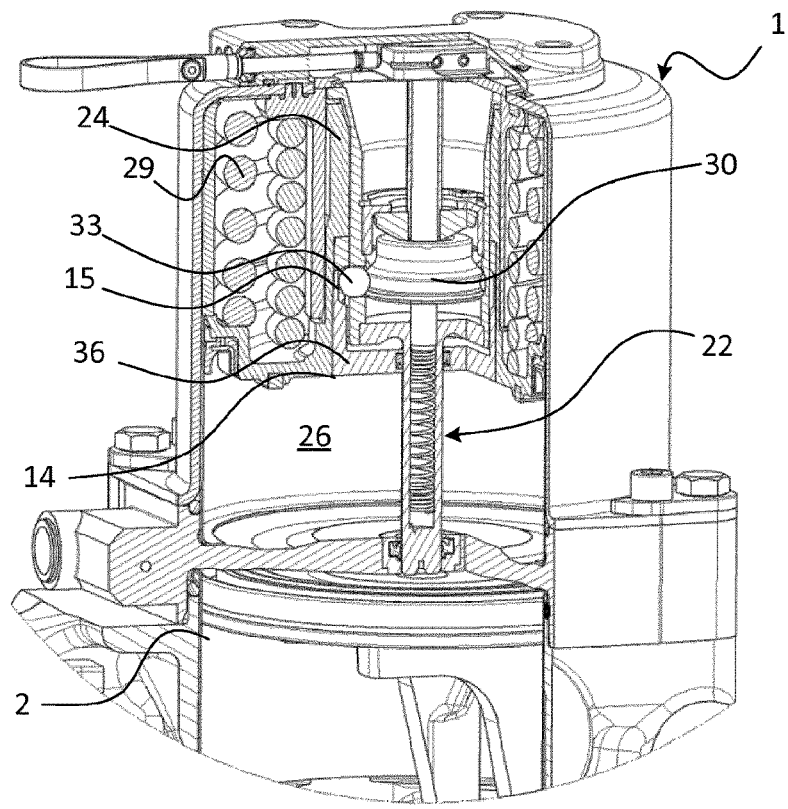
FIG. 4 is an isometric partially cross-sectional view of the brake actuator in a locked and charged state.

Furthermore, the brake actuator 1 comprises a piston 24 mounted in the cylindrical portion 25 of the body 20 and defining together with the body 20 a pressure chamber 26 depicted in FIG. 4. The pressure chamber 26 is supplied with pressurized fluid through a conduit 13 (see FIG. 1). The piston 24 is movable between a loaded position in which resilient means in the form of springs 29 are compressed, and actuated positions in which the springs 29 are at least partially released in relation to the charged position. Sealing between the piston 24 and the cylinder 25 is provided by a seal 27.

The piston 24 comprises at its center an annular space or orifice 17 through which the thrust sleeve 22 translates. In particular, as shown in FIG. 3, the thrust sleeve 22 comprises a cylindrical portion 22A and a hollow shaft portion 22B having a diameter substantially smaller than the diameter of the cylindrical portion 22A. The cylindrical portion 22A is slidingly received in the orifice 17 of the piston 24 and the hollow shaft portion 22B is slidingly received in the opening 21 of the base member 19. Resilient means, formed in the present example by the springs 29, continuously urge the piston 24 towards its actuated position.

A slide 30 is further disposed within the thrust sleeve 22 and adapted to translate axially between a locking position and a release position as will be further explained herein. In the schematic view of FIG. 3, the slide 30 is in the release position and the piston 24 in a fully actuated position.

The brake actuator 1 further comprises an anchoring member 36 received in the annular orifice 17 of the piston 24 and shaped to form an axial flush surface 18 with an axial inner surface 16 of the piston 24. In addition, the anchoring member 36 is received in the piston 24 to form therewith a transverse surface 14 which may be substantially flush and face the pressure chamber 26. In this sense, the transverse surface 14 is a pneumatic surface on which pressurized fluid of the pressure chamber 26 acts. The pressure in the pressure chamber 26 thus exerts pneumatic force directly to the piston 24 and to the anchoring member 36, i.e. the transverse surface 14

Figure 3:
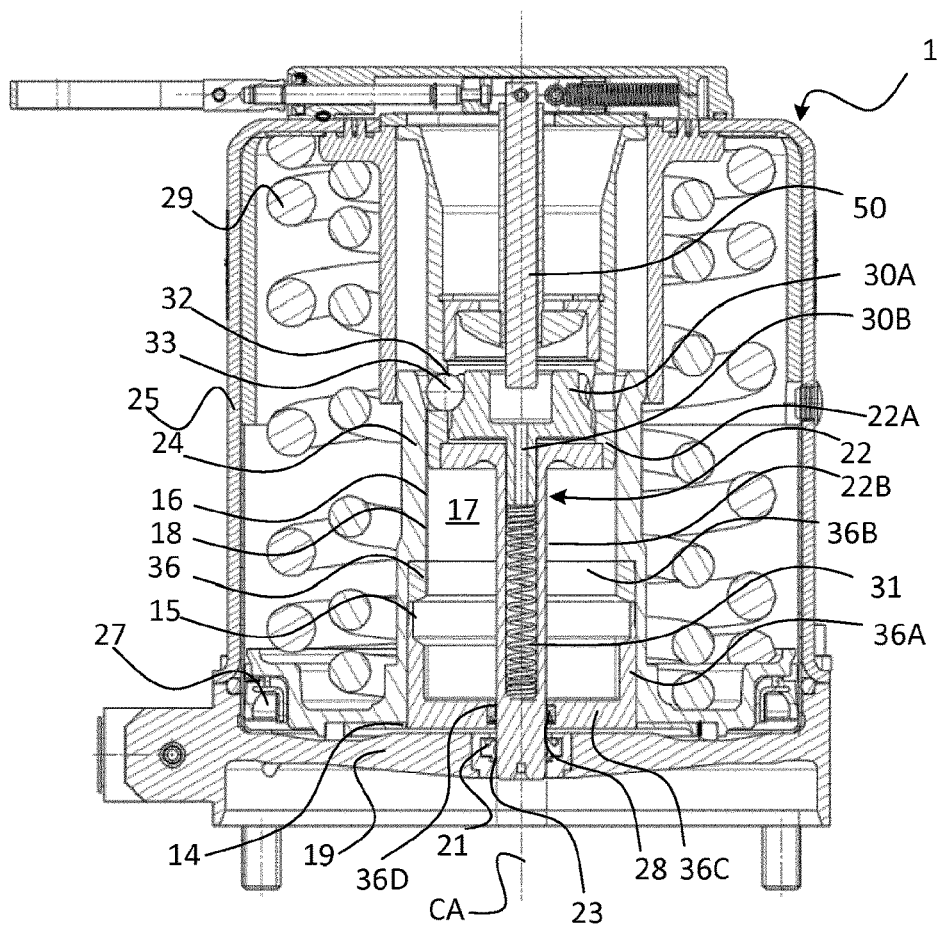
FIG. 3 is a cross-sectional side view of the brake actuator of FIG. 1 in a released and fully actuated state.

The piston 24 envelopes the thrust sleeve 22 as depicted in FIG. 3. The anchoring member 36 comprises an annular portion 36A surrounding the thrust sleeve 22 and having an inner diameter corresponding to the outer diameter of the cylindrical portion 22A of the thrust sleeve 22 allowing the latter to translate therein. The annular portion 36A of the anchoring member 36 has an upper open end portion 36B and a lower bottom end 36C which is substantially closed and provided with a centrally arranged orifice 36D which slidingly receives the hollow shaft portion 22B of the thrust sleeve 22, allowing it to translate there through. The bottom end portion 36C may be disc-shaped, as depicted in FIG. 3, and provided with the centrally arranged orifice 36D.

A dimensional ratio between the outer diameter of hollow shaft portion 22B of the thrust sleeve 22 and the inner diameter of the cylinder 25 may be in the range of 0.08-0.15; preferably less than 0.1. In an exemplary embodiment the dimensional ratio is about 0.09.

The selected dimensional ratio facilitates that at a provided preparation pressure in pressure chamber 26 and a provided installation dimension i.e. a limiting parameter to the diameter of cylindrical portion 25. The present design enables increased actuation force in that relatively larger spring forces can be accommodated using the same installation dimension.

Accordingly, the brake actuator 1 described herein achieves an improved actuation force per mounting/installation dimension. Thus, available installation dimension may be utilized more efficiently in that the actuator can be provided with a more compact design.

Sealing between the thrust sleeve 22 and the bottom end portion 36C of the anchoring element 36 is provided by a seal 28.

The brake actuator 1 comprises a plurality of balls 33, in the described example ten balls 33, disposed in respective circular opening 32 of the thrust sleeve 22 between the slide 30 and the anchoring member 36 and/or piston 24. The openings 32 are spaced and evenly distributed around the perimeter of the thrust sleeve 22 and extend transversely to its longitudinal axis.

The balls 33 have a diameter matching the diameter of the openings 32 and a cross section adapted to occupy a radially outwards projecting position in relation to the thrust sleeve 22 corresponding to the locking position of the slide 30 and a retracted position in relation to the sleeve 22 corresponding to the release position of the slide 30.

Figure 5:
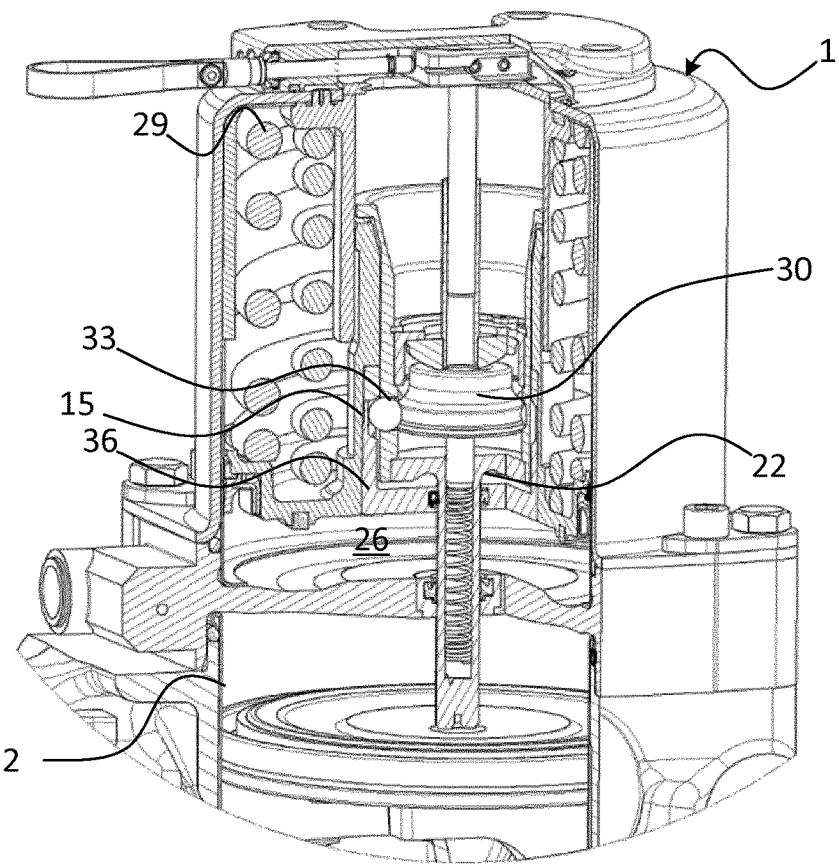
FIG. 5 is an isometric partially cross-sectional view of the brake actuator in a locked and actuated state.
Figure 6:
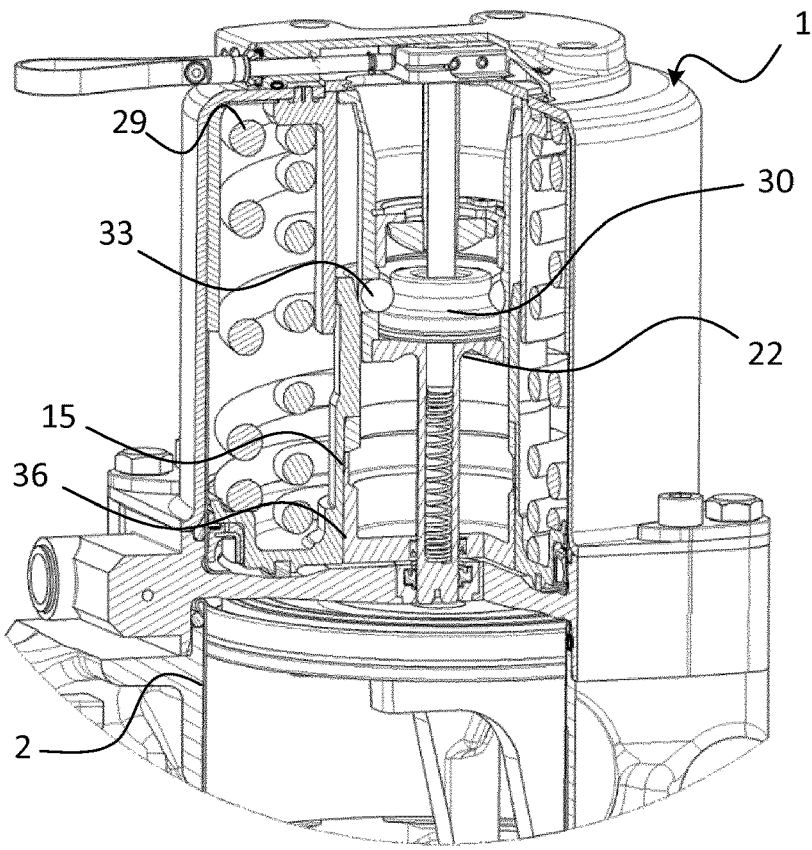
FIG. 6 is an isometric partially cross-sectional view of the brake actuator in a released and actuated state.

When the slide 30 is in the locking position, the anchoring member 36 is adapted to axially drive the thrust sleeve 22 through engagement with the balls 33, as shown in FIGS. 4 and 5. Conversely, when the slide 30 is in release position, the anchoring member 36 is axially uncoupled from the thrust sleeve 22. This is shown in FIGS. 3 and 6.

The balls 33 are caused to move radially outwards to adopt the projecting position under the action of a lateral surface 38A-D of the slide 30.

The slide 30 is permanently biased towards its locking position by resilient means in the shape of a spring 31 disposed between the slide 30 and the thrust sleeve 22. In particular, the spring 31 is disposed in the hollow shaft portion 22B of the thrust sleeve 22, in which the slide 30 is received.

As shown in FIG. 3, the slide 30 comprises a head portion 30A and a tail portion 30B in the shape of a push rod as depicted in the detail view of FIG. 7. The tail portion 30B is received in the hollow shaft portion 22B of the thrust sleeve 22 as shown in FIG. 3.

With reference being to FIG. 7, the slide 30 is rotation symmetric about a center axis C thereof. In particular, the head portion 30A is rotation symmetric. The head portion 30A comprises a chamfered profile surface 38. In particular, the head portion 30A is chamfered to comprise a sequence of circumferentially and continuously extending grooves 38A, 38B, 38C, 38D. These grooves, starting from the end of the head portion 30A opposite the tail portion 30B, form a sequence of grooves 38A, 38B, 38C, 38D of progressively increased radius. Thereby the slide 30 is provided with a laterally extending profile surface 38 of progressively increasing radius in the axial direction of the slide 30 towards the tail portion 30B. Thus, each transverse cross-section of the slide 30 has a constant radius.

The slide 30 comprises two cylindrical portions providing a narrow release groove 38A and an expanded locking groove 38C. A curved transitional groove 38B extends between the release groove 38A and the expanded locking groove 38C. A heel groove 38D with a diameter greater than the locking groove 38C provides the slide 30 with a stop for retaining the balls 33 on the lock groove 38C in the axial direction.

The transitional groove 38B comprises a circle arc shaped profile portion which may have a radius similar to that of the balls 33. Hereby the balls 33 are in contact with the surface of the release groove 38B on a circle arc shaped line in the respective balls transition from the release groove 38A to the locking groove 38C or vice versa.

When the slide 30 translates from the release position to the locking position, the respective grooves 38A-38D of the profiled slide surface 38 engages with the balls 33 to cause the balls 33 to move radially outwards and to adopt a locking position wherein the balls 33 engage with the anchoring member 36.

The number of balls 33 may be selected depending on a number of parameters including, but not limited to, the restraining force of spring 29. The number of balls 33 may be in the range of three to sixteen. In the example described herein the number of balls 33 is ten.

The anchoring member 36 comprises a circumferentially extending local depression in the shape of an inner recess 15 for receiving the balls 33 in their respective release position, which corresponds to the projecting position in relation to the thrust sleeve 22. The recess 15 protrudes radially outwards into the flush wall 18 and a cross section thereof may comprise two opposing bevels providing an upper boundary and a lower boundary respectively, having a lateral surface formed there between. The bevels may be linear.

The brake actuator 1 also comprises a release device 50 which is adapted to push the slide 30 into the thrust sleeve 22 by compressing the spring 31. The release device 50 is therefore adapted to cause the slide 30 to translate from its locking position to its release position as shown in FIG. 6.

The operation of the brake actuator 1 in capacity of a parking brake will now be explained with reference to the Figures.

In FIG. 4, the brake actuator 1 is in the charged or loaded state. A pressurized fluid circuit (not shown) typically pressurizes the pressure chamber 26 via the conduit 13 (see FIG. 1) and maintains the piston 24 in its high charged position by exerting pneumatic pressure on the piston 24 and the anchoring member 36 which axially acts on the piston 24, thereby forcing the piston 24 to compress the springs 29.

In the position shown in FIG. 4, the slide 30 is in its locking position by virtue of the biasing of the spring 31. In this position, the anchoring member 36 and the thrust sleeve 22 are axially coupled/engaged through the recess 15 coupled to the thrust sleeve 22 by engaging with the balls 33. As shown, the balls 33 are situated in the explained projecting position relative to the thrust sleeve 22.

Each ball 33 rests on the perimeter of the respective opening 32 and is trapped laterally between the recess 15 of the anchoring member 36 and the locking groove 38C.

The balls 33 are placed on a circle when arranged in their respective locking position and when arranged in their respective release position. This circle is disposed in a transverse plane of the brake actuator 1 and coaxially with the center axis CA thereof (see FIG. 4). As understood from FIGS. 4 and 7, the axes CA and C coincide on a common axis.

The diameter of the circle expands symmetrically in a uniform manner as the balls 33 simultaneously move from their respective release positions towards their respective locking positions, and the diameter of the circle decreases symmetrically in a uniform manner as the balls 33 simultaneously move from their respective lock positions towards their respective release positions.

When the balls 33 are in locking position, the recess 15 coincides with the openings 32 and the lock groove 38C. When the balls 33 are in release position, the head 30A of the slide 30 rests on or substantially abuts the bottom end portion of the annular portion 22A of the thrust sleeve 22, and the openings 32 coincide with the release groove 38A.

The center axes of openings 32 in the thrust sleeve 22 are symmetrically arranged in a transverse plane of the brake actuator 1.

The recess 15 is formed in the anchor member 36 in such manner that when the annular portion 22A of the thrust sleeve 22 rests on or abuts the disc shape of the lower anchor member end portion 36C, the recess 15 coincides with the openings 32 of the thrust sleeve 22.

Furthermore, the recess 15 is formed in the anchor member 36 in such way that when the piston 24 is in its charged position and the thrust sleeve 22 also is in its charged position, the recess 15 coincides with the openings 32 of the thrust sleeve 22.

From the position of FIG. 4, a pressure drop in the pressure chamber 26 causes the spring force of springs 29 to overcome the resulting pneumatic force exerted collectively on piston 24 and anchoring member 36. Hereby the piston 24 is pushed towards an actuated position with the effect of driving or biasing the anchoring member 36 and the thrust sleeve 22. Since the balls 33 are in projecting position, the anchoring member 36 thus drivingly engages the balls 33 in its axial movement, whereby the balls 33 drivingly engage the thrust sleeve 22. The hollow shaft portion 22B of the thrust sleeve 22 is thus caused to translate axially through the opening 21 in the base member 19, thus protruding from the body 20 to provide braking force to the brake cylinder 2 as shown in FIGS. 4 and 5.

The braking force of the actuator 1 may be suspended by pressurizing pressure chamber 26 to overcome the spring force of the springs 29.

Alternatively, the braking force of the actuator 1 may be suspended by means of a release device 50.

The engagement of the release device 50 causes the slide 30 to adopt a release position, whereby the balls 33 move over the profile 38A, 38B, 38C of the slide 30, thus approaching the axis C of the slide 30 to be arranged to abut the release groove 38A corresponding to a release position of the balls 33 as depicted in FIG. 6.

While the balls 33 occupy their retracted position, the anchoring member 36 is axially uncoupled from the thrust sleeve 22 whereby the thrust sleeve 22 translates axially in respect of the anchoring member 36 under a counter force exerted by the brake cylinder 2.

Finally it should be mentioned that the invention is by no means limited to the embodiments described herein, and many modifications are feasible within the spirit and scope of the invention set forth in the appended claims. For instance, it has been contemplated that the anchor member 36 may be formed as an integral part of the piston 24. In addition, the release device 50 has herein been described in terms of its function, but this device 50 may be subjected to modification or take suitable forms other than the exemplary embodiment described herein as long as a corresponding function is achieved.

The invention claimed is:

1. A brake actuator for a brake cylinder of a railway vehicle brake system, said brake actuator comprising:
    a thrust sleeve configured to provide braking force to said brake system;
    a slide mounted in said thrust sleeve and movable axially between a release position and a locking position;
    a piston biased by resilient means and linked to an anchoring member; and
    a plurality of balls disposed in respective openings of said sleeve between the slide and the anchoring member;
    wherein said balls in said locking position are configured to move under action of a profiled surface of the slide to adopt a projecting position in relation to said sleeve to axially couple the anchoring member with the sleeve;
    wherein said balls in said release position are configured to adopt a retracted position in relation to said sleeve to axially uncouple the anchoring member from the sleeve;
    wherein said profiled surface of the slide comprises a locking groove configured to engagingly receive said balls when the slide is in said locking position; and
    wherein said locking groove is circumferentially oriented and extends continuously along a circumference of said slide.

2. The brake actuator according to claim 1, wherein said profiled slide surface comprises a release groove configured to engagingly receive said balls when the slide is in said release position; and wherein said release groove is circumferentially oriented and extends continuously along a circumference of said slide.

3. The brake actuator according to claim 2, wherein said release groove and/or said locking groove each comprises cylindrical portions extending parallel to a center axis of said slide.

4. The brake actuator according to claim 1, wherein said anchoring member comprises an annular portion with an open end portion configured to receive said sleeve and a bottom end portion provided with a centrally arranged orifice having a diameter that is smaller than the diameter of said open end portion.

5. The brake actuator according to claim 4, wherein said thrust sleeve comprises a cylindrical portion and a hollow shaft portion having a diameter that is smaller than the diameter of said cylindrical portion.

6. The brake actuator according to claim 5, wherein said slide comprises a head portion received in said annular portion, and a tail portion which has a smaller diameter and which is received in said hollow shaft portion.

7. The brake actuator according to claim 5, wherein said hollow shaft portion is configured to protrude through said centrally arranged orifice.

8. The brake actuator according to claim 5, wherein said hollow shaft portion envelopes and houses a resilient member acting on said slide.

9. The brake actuator according to claim 1, wherein said anchoring member is received in said piston to form a flush lateral surface and/or a transverse surface therewith.

10. The brake actuator according to claim 1, wherein said anchoring member comprises a circumferentially extending recess configured to receive and engage said balls in said locking position.

11. The brake actuator according to claim 2, wherein said slide comprises a transition groove which extends from said release groove to said locking groove and which has a curved portion; and wherein said transition groove is circumferentially oriented and extends continuously along a circumference of said slide.

12. The brake actuator according to claim 1, further comprising a release device configured to drive said slide from its locking position to its release position.

13. A brake actuator for a brake cylinder of a railway vehicle brake system, said brake actuator comprising:
a thrust sleeve configured to provide braking force to said brake system;
a slide mounted in said thrust sleeve and movable axially between a release position and a locking position;
a piston biased by resilient means and linked to an anchoring member; and
a plurality of balls disposed in respective openings of said sleeve between the slide and the anchoring member;
wherein said balls in said locking position are configured to move under action of a profiled surface of the slide to adopt a projecting position in relation to said sleeve to axially couple the anchoring member with the sleeve;
wherein said balls in said release position are configured to adopt a retracted position in relation to said sleeve to axially uncouple the anchoring member from the sleeve; and
wherein said anchoring member comprises an annular portion with an open end portion receiving said sleeve, and a bottom end portion provided with a centrally arranged orifice.

14. The brake actuator according to claim 13, wherein said thrust sleeve comprises a cylindrical portion and a hollow shaft portion having a diameter that is smaller than the diameter of said cylindrical portion; and wherein said hollow shaft portion is received in said centrally arranged orifice.

15. A railway vehicle brake system, comprising a brake actuator as claimed in claim 1.

* * * * *